US010066499B2

(12) United States Patent
Mariotti et al.

(10) Patent No.: US 10,066,499 B2
(45) Date of Patent: Sep. 4, 2018

(54) TURBOEXPANDER AND DRIVEN TURBOMACHINE SYSTEM (71) Applicant: Nuovo Pignone SRL, Florence (IT)

(72) Inventors: Gabriele Mariotti, Florence (IT); Paolo Del Turco, Florence (IT); Matteo Berti, Florence (IT); Giacomo Landi, Oslo (NO)

(73) Assignee: Nuovo Pignone Srl, Florence (IT)

( * ) Notice: Subject to any disclaimer, the term of this patent is extended or adjusted under 35 U.S.C. 154(b) by 295 days.

(21) Appl. No.: 14/432,839

(22) PCT Filed: Sep. 27, 2013

(86) PCT No.: PCT/EP2013/070265
§ 371 (c)(1),
(2) Date: Apr. 1, 2015

(87) PCT Pub. No.: WO2014/053421
PCT Pub. Date: Apr. 10, 2014

(65) Prior Publication Data
US 2015/0292349 A1 Oct. 15, 2015

(30) Foreign Application Priority Data

Oct. 1, 2012 (IT) ................ FI2012A0196

(51) Int. Cl.
*F01D 17/16* (2006.01)
*F01K 23/10* (2006.01)
(Continued)

(52) U.S. Cl.
CPC ............ *F01D 17/16* (2013.01); *F01D 1/02* (2013.01); *F01K 13/02* (2013.01); *F01K 23/10* (2013.01);
(Continued)

(58) Field of Classification Search
CPC ...... F25B 27/002; F25B 27/02; F25B 27/005; F25B 1/053; F02C 6/18; F02C 6/06;
(Continued)

(56) References Cited

U.S. PATENT DOCUMENTS 3,421,685 A * 1/1969 Anderson ........... F04D 27/0246
415/10
3,764,814 A * 10/1973 Griffith .................. H02P 23/16
290/2

(Continued)

FOREIGN PATENT DOCUMENTS

CN      1867754 A     11/2006
EP      2400117 A1    12/2011
(Continued)

OTHER PUBLICATIONS

"First Application of GE ORegen organic Rankine Cycle Waste Heat Recovery System at Alliance Pipeline Compressor Station in Alberta" Green Car Congress, Nov. 1, 2011 retrieved from http://www.greencarcongress.com/2011/11/first-application-of-ge-oregen-organic-rankine-cycle-waste-heat-recovery-system-at-alliance-pipeline.html.*

(Continued)

*Primary Examiner* — Ninh H Nguyen
*Assistant Examiner* — Topaz L Elliott
(74) *Attorney, Agent, or Firm* — GE Global Patent Operation (57) ABSTRACT A turboexpander and driven turbomachine system comprising a turboexpander configured for expanding a first fluid and comprising an expander stage with one expander impeller; a first set of moveable inlet guide vanes at the inlet of the expander stage; a driven turbomachine configured for processing a second fluid and comprising a turbomachine impeller; a second set of moveable inlet guide vanes at the (Continued)

inlet of the turbomachine impeller; a mechanical transmission between the turboexpander and the driven turbomachine; and a controller connected to the second set of moveable inlet guide vanes and configured for controlling the second set of moveable inlet guide vanes for adjusting the rotary speed of the driven turbomachine and said turboexpander.

20 Claims, 5 Drawing Sheets

(51) Int. Cl.
    *F01K 13/02*      (2006.01)
    *F01K 25/08*      (2006.01)
    *F01D 1/02*      (2006.01)
    *F02C 6/18*      (2006.01)
    *F02C 9/20*      (2006.01)
    *F02C 7/36*      (2006.01)

(52) U.S. Cl.
CPC ............ *F01K 23/101* (2013.01); *F01K 25/08* (2013.01); *F02C 6/18* (2013.01); *F02C 7/36* (2013.01); *F02C 9/20* (2013.01); *F05D 2270/024* (2013.01); *F05D 2270/301* (2013.01); *F05D 2270/303* (2013.01); *F05D 2270/3011* (2013.01); *F05D 2270/3013* (2013.01)

(58) Field of Classification Search
CPC .. F05D 2270/024; F01D 17/16; F01D 17/165; F01K 23/10; F01K 25/08; F01K 13/02; F01K 23/00; F01K 23/02; F01K 23/06; F01K 23/08; F01K 23/101; F01K 23/15; F01K 23/16; F01K 17/025
See application file for complete search history.

(56) References Cited

U.S. PATENT DOCUMENTS

| | | | | |
|---|---|---|---|---|
| 3,981,140 | A | | 9/1976 | Lunsford et al. |
| 4,281,970 | A | * | 8/1981 | Stewart ............... F02C 6/10 417/22 |
| 4,359,871 | A | * | 11/1982 | Strass ................. F02C 1/02 290/52 |
| 4,370,560 | A | * | 1/1983 | Faulkner .............. F02C 9/58 290/40 C |
| 6,155,076 | A | * | 12/2000 | Cullen ................. F02C 1/02 62/606 |
| 7,950,214 | B2 | | 5/2011 | Bronicki et al. |
| 8,528,333 | B2 | * | 9/2013 | Juchymenko ......... F01K 23/065 60/618 |
| 8,590,307 | B2 | * | 11/2013 | Kopecek .............. F01K 25/10 60/618 |
| 8,944,746 | B2 | * | 2/2015 | Mariotti .............. F01D 17/16 415/1 |
| 9,303,565 | B2 | * | 4/2016 | Fichtner .............. F02C 9/20 |
| 2003/0046950 | A1 | | 3/2003 | Panin et al. |
| 2009/0055071 | A1 | * | 2/2009 | Way .................. F02C 9/28 701/100 |
| 2009/0232663 | A1 | | 9/2009 | Mirsky et al. |
| 2009/0320477 | A1 | * | 12/2009 | Juchymenko ......... F01K 23/065 60/651 |
| 2011/0305556 | A1 | * | 12/2011 | Asti ................... F01D 17/165 415/1 |

FOREIGN PATENT DOCUMENTS

| | | |
|---|---|---|
| JP | 2005325752 A | 11/2005 |
| RU | 2110022 C1 | 4/1998 |
| RU | 2156929 C1 | 9/2000 |

OTHER PUBLICATIONS

Unofficial English Translation of IT Search Report and Opinion issued in connection with corresponding IT Application No. FI2012A000196 dated Jun. 18, 2013.

PCT Search Report and Written Opinion issued in connection with corresponding Application No. PCT/EP2013/070265 dated Nov. 5, 2013.

Unofficial English translation of Office Action issued in connection with corresponding CN Application No. 201380051456.4 dated Jul. 12, 2016.

Russian Office Action issued in connection with corresponding RU Application No. 2015110478 dated Jun. 30, 2017.

\* cited by examiner

Fig.1
STATE OF THE ART

TURBOEXPANDER AND DRIVEN TURBOMACHINE SYSTEM

BACKGROUND

Embodiments of the subject matter disclosed herein generally relate to systems comprising turboexpanders and driven turbomachines and methods for operating the same.

Turboexpanders are widely used for industrial refrigeration, oil and gas processing and in low temperature processes. In some known applications turboexpanders are used in heat recovery cycles to drive an electric generator. US 2011/0305556 discloses a system and method for power generation including a turboexpander with at least two expansion stages for heat recovery and mechanical power generation to drive an electric generator. In this known application the turboexpander is introduced in a Rankine cycle.

Figure 1:
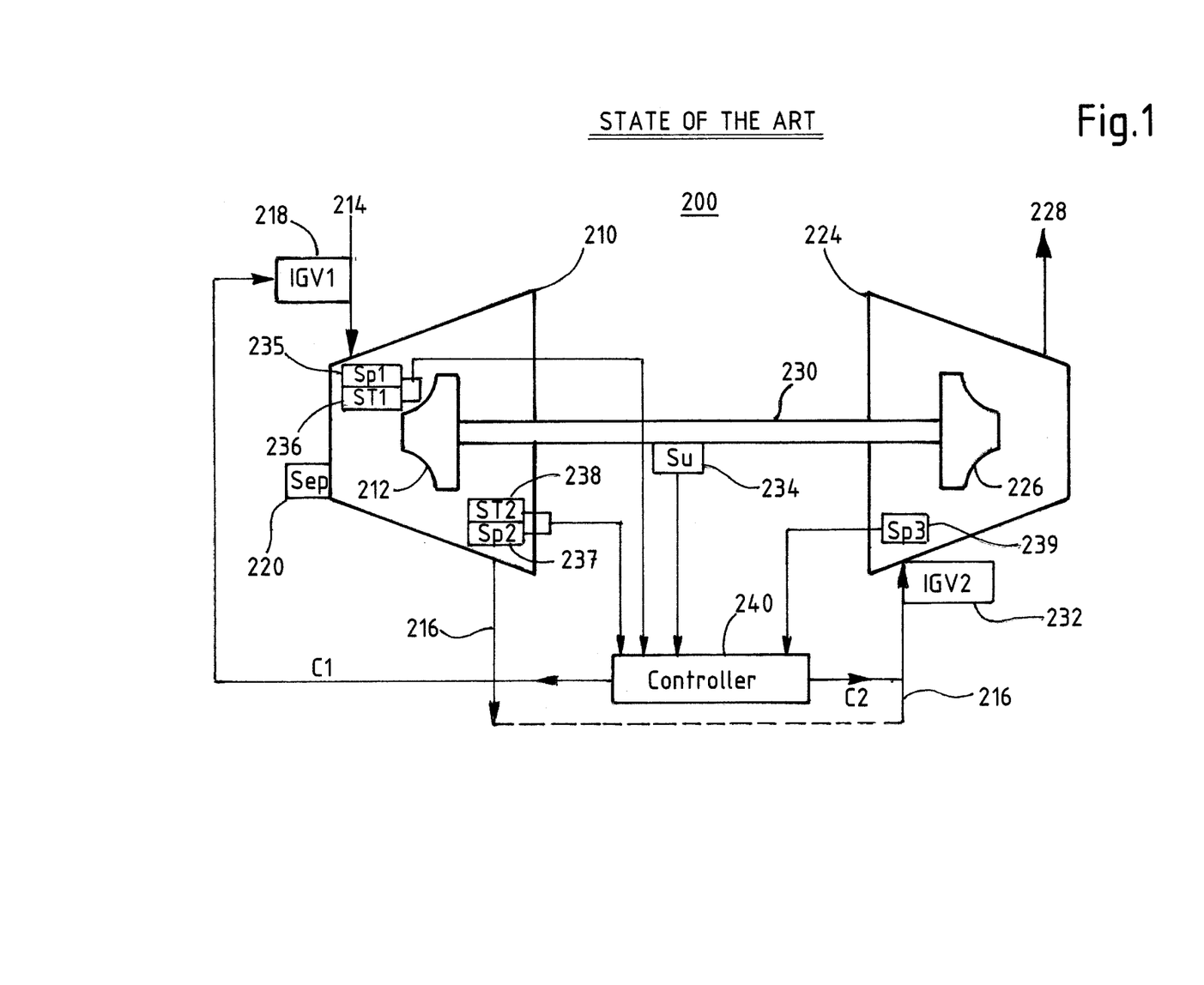
FIG. 1 illustrates a turboexpander-compressor system of the prior art.

EP 2400117 discloses the application of a turboexpander-compressor system according to the prior art, wherein the same fluid is processed in the turboexpander and in the compressor. FIG. 1 illustrates the turboexpander-compressor system of the prior art. The system is labeled 200. A turboexpander 210 has a turboexpander impeller 212. The turboexpander 210 receives an inlet gas flow at 214. Inside the turboexpander 210 the gas may expand and thus cause rotation of the turboexpander impeller 212. The expanded gas exits the turboexpander 210 at 216 enabled by a separator (Sep) 220. When the turboexpander-compressor system 200 functions at design conditions, a pressure p1 and a temperature T1 measured respectively by a sensor Sp1 235 and sensor ST1 236 of the inlet gas flow at 214, as well as a pressure p2 and a temperature T2 measured respectively by a sensor Sp2 237 and sensor ST2 238 of the gas flow at the exit side 216 have values close to predetermined values. However, in some situations the turboexpander-compressor system operates in off-design conditions. When off-design conditions occur, the pressure p1 of the incoming gas flow at 214 may be adjusted to become again close to the respective rated value, using, for example, a first set of moveable input guide vanes (IGV1) 218. The first set of moveable input guide vanes 218 are located at an inlet of the turboexpander 210.

In the turboexpander-compressor system 200 illustrated in FIG. 1, a compressor 224 has a compressor impeller 226. The compressor 224 receives the gas flow from the turboexpander 210 and delivers a compressed gas flow at the delivery side 228. However, between the turboexpander 210 and the compressor 224, the pressure of the gas flow may be altered due to other process components (e.g., separators, coolers, valves) and pressure losses, so that the gas flow at 216 has pressure p3 when entering the compressor 224 measured by sensor (Sp3) 239.

The mechanical work generated by the expansion of the gas in the turboexpander rotates the turboexpander impeller 212. The turboexpander impeller 212 is mounted on the same shaft 230 as the compressor impeller 226. The compressor impeller 226 therefore rotates due to the mechanical work generated during the expansion of the gas in the turboexpander 210. The rotation of the compressor impeller 226 provides energy used to compress the gas in the compressor 224. The mechanical work necessary to rotate the compressor impeller 226 affects the rotating speed u of the shaft 230 measured by speed sensor (Su) 234 and, thereby, indirectly affects the process of expanding the gas inside the turboexpander 210.

The turboexpander efficiency is related to a ratio of the rotating speed u of the shaft 230 and the enthalpy drop ΔH across the turboexpander 210. The gas expansion in the turboexpander 210 may be considered approximately an isoentropic process.

The characteristic parameters (i.e., p1, T1, p2 and T2) of the gas expansion in the turboexpander 210 and the rotating speed u of the shaft 230 may not vary independently. Therefore, in off-design conditions, in order to maximize the turboexpander efficiency, the pressure p3 of the gas flow at the inlet 216 of the compressor 224 may be controlled, for example, by a second set of moveable inlet guide vanes IGV2 232 provided at the compressor inlet. By modifying the pressure p3 of the gas flow 216 input in the compressor 224, the rotating speed u of the shaft 230 is modified and, therefore, the efficiency of the turboexpander 210 can be maximized.

A controller 240 receives information regarding the pressure p1 and the temperature T1 of the gas flow at the inlet side 214 of the turboexpander 210, the pressure p3 of the gas flow at the inlet 216 of the compressor 224, and the rotating speed u of the shaft 230, by suitable sensors. The controller 240 may send commands C1 to IGV1 218 in order to adjust the pressure p1 of the gas flow at the turboexpander inlet 214 to be within a predetermined range. Based on monitoring the acquired information, the controller 240 determines when the turboexpander-compressor system 200 functions in off-design conditions. When the controller 240 determines that the turboexpander-compressor system 200 functions in off-design conditions, the controller 240 sends commands C2 to the second set of IGV2 232 to adjust the pressure p3 of the gas input into the compressor in order to maximize a ratio R between the rotating speed u of the shaft 230 and the enthalpy drop ΔH across the turboexpander 210.

In this known embodiment, the same controller controls the moveable inlet guide vanes of the turboexpander and the moveable inlet guide vanes of the compressor to optimize the efficiency of the system, based on the assumption that the same fluid is processed in the two turbomachines.

SUMMARY OF THE INVENTION

Embodiments of the disclosure relate a turboexpander and driven turbomachine system. The turboexpander-driven turbomachine system may include: a turboexpander configured for expanding a first fluid and comprising at least one expander stage with one expander impeller; at least a first set of moveable inlet guide vanes at the inlet of the expander stage; and a driven turbomachine configured for processing a second fluid and comprising at least one turbomachine impeller provided with a second set of moveable inlet guide vanes at the inlet of the turbomachine impeller. The system may further include a mechanical transmission between the turboexpander and the driven turbomachine. The system may further comprise a controller connected to the second set of moveable inlet guide vanes and configured for controlling the second set of moveable inlet guide vanes to adjust the rotary speed of said driven turbomachine and said turboexpander.

Separate sets of moveable inlet guide vanes, at the inlet of the turboexpander and at the inlet of the driven turbomachine, respectively, allow control over the rotary speed of the system on the one hand, and optimizing the power produced by the turboexpander on the other. For instance, the first fluid can be processed in a closed heat recovery thermodynamic cycle, and the moveable inlet guide vanes of the first set are used to adjust the operating conditions of the turboexpander based on the heat available from a heat source. The second fluid can e.g. be a gas or a liquid processed by a compressor or a pump, and the moveable inlet guide vanes of the second set are used for instance to adjust the flow rate of the second fluid through the driven turbomachine, to set, adjust or maintain the desired rotary speed of the system.

In some embodiments the mechanical transmission is configured so as to provide a fixed transmission ratio between the turboexpander and the driven turbomachine. In some exemplary embodiments the turboexpander has a single impeller mounted on a shaft. The driven turbomachine has at least one impeller mounted on the same shaft, so that the two machines rotate at the same rotary speed, the transmission ratio being 1. A single shaft can be formed by one or more shaft portions. Joints can be provided to connect two or more shaft portions to one another. Joints can be rigid joints, elastic joints, or clutches or the like.

In other exemplary embodiments the turboexpander can comprise more than one stage, each stage including at least one impeller. At least one or, in an embodiment, all the impellers can be provided with respective moveable inlet guide vanes. If more than one set of moveable inlet guide vanes is provided, at the inlet of more than one stage, each set of moveable inlet guide vanes can be controlled independently of the other for optimal operation of each turboexpander stage.

In some embodiments the multistage turboexpander can be a so-called integrally geared turboexpander. An integrally geared turboexpander can include a central toothed wheel, meshing with two or more gears peripherally arranged around the axis of the toothed wheel. Each gear is mounted on a shaft of a corresponding turboexpander impeller. In this case each turboexpander stage can rotate at its own rotary speed, the speed ratio between the shafts being optimized to maximize the overall efficiency of the turboexpander. A further gear mounted on a power output shaft can mesh with the central toothed wheel. The power output shaft can in turn support one or more impellers of the driven turbomachine. With this arrangement, a fixed rotary speed ratio is provided between the power output shaft and each driving shaft of each turboexpander stage.

According to some embodiments, the first set of moveable inlet guide vanes is configured for controlling at least one parameter of the first fluid, which is processed by the turboexpander. If the turboexpander is comprised of more than one impeller, each impeller can be provided with its own first set of moveable inlet guide vanes. In this case, each set of moveable inlet guide vanes provided for the turboexpander can be designed for controlling at least one parameter of the first fluid entering the respective turboexpander stage.

In some embodiments, the parameter of the first fluid is a fluid pressure at the inlet of the turboexpander stage, or at each turboexpander stage provided with moveable inlet guide vanes.

According to some embodiments of the disclosure the controller is configured for receiving information on the rotary speed of the driven turbomachine and for controlling the second set of moveable inlet guide vanes to adjust the rotary speed at a desired speed value. Since typically a fixed transmission ratio exists between the shaft of the driven turbomachine and the shaft of the turboexpander, or of the shaft of each turboexpander stage, controlling the rotary speed of the driven turbomachine implies also controlling the rotary speed of the turboexpander or of each turboexpander stage.

Generally speaking, the controller can be configured to control the rotary speed according to any desired function.

In some embodiments of the disclosure, the controller is configured for maintaining the rotary speed at a fixed desired value, or within an allowable value range around a constant speed value, e.g. +/−2% about the desired rotary speed, said values being only by way of example and not limiting the scope of the present disclosure.

The first set of moveable inlet guide vanes at the inlet of the turboexpander, and/or each first set of moveable inlet guide vanes at the inlet of each turboexpander stage can be controlled for maximizing the power generated by the turboexpander. In some embodiments, a controller and a servo-actuator can be provided for controlling said first set(s) of moveable inlet guide vanes. The controller can be configured for adapting the position of the moveable inlet guide vanes according to one or more parameters of the first fluid, flowing through the turboexpander, in order to maximize the energy recovered by expanding the fluid in the turboexpander.

According to some embodiments the fluid processed by the turboexpander is a working fluid of a closed thermodynamic cycle, for instance the fluid of a heat recovery cycle. In some embodiments the heat recovery cycle can be a Rankine cycle. In some embodiments the heat recovery cycle is an organic Rankine cycle. For instance, the heat recovery cycle can include a condenser, a pump, heat exchanging arrangements, for recovering heat from a heat source and vaporizing the fluid being processed by the heat recovery thermodynamic cycle. In some embodiments, the cycle can include a heater and a super-heater arranged in series along the circuit of the working fluid, between the pump and the turboexpander. In some embodiments, efficiency of the cycle can be increased by a recuperator, where heat in the expanded fluid exiting the turboexpander is transferred to the pressurized, cold fluid delivered by the pump.

In exemplary embodiments, the driven turbomachine may comprise a pump or a compressor, e.g. a centrifugal compressor or centrifugal pump. The driven turbomachine can be a single-stage or multi-stage turbomachine.

According to a further aspect, the disclosure generally relates to a method for operating a system comprising a turboexpander, a turbomachine mechanically driven by the turboexpander, at least a first set of moveable inlet guide vanes at the turboexpander, a second set of moveable inlet guide vanes at the driven turbomachine. According to some embodiments, the method comprises the steps of:

expanding a first fluid through said turboexpander and producing mechanical power therewith;

rotating said driven turbomachine by means of said power;

processing a second fluid through said driven turbomachine;

controlling said second set of moveable inlet guide vanes for adjusting the rotary speed of said driven turbomachine and said turboexpander.

A further step of controlling the second set of moveable inlet guide vanes to maintain the rotary speed within a range around a constant value can further be provided. Furthermore, also a step of controlling the first set of moveable inlet guide vanes for maximizing the power produced by said turboexpander can be provided.

If the turboexpander and/or the driven turbomachine comprises more than one stage, each stage can be provided with the respective set of moveable inlet guide vanes. Therefore, the term "first set of moveable inlet guide vanes" can include a single set of moveable inlet guide vanes at the inlet of one turboexpander impeller, or more than one set, at the inlet of more than one such impeller. Similarly, the term "second set of moveable inlet guide vanes" can include a single set of moveable inlet guide vanes at the inlet of one impeller of the driven turbomachine, or more than one set, at the inlet of more than one driven impeller.

According to some embodiments, the method can comprise the step of recovering heat from a heat source by means of the first fluid processed by the turboexpander, and partly converting the heat in mechanical power in the turboexpander. The first fluid can be processed in a closed thermodynamic cycle, the method including the steps of condensing, pressurizing, heating, vaporizing the first fluid; expanding the first fluid in the turboexpander generating power and condensing again the expanded fluid. The method can include recovering heat from an upper thermodynamic cycle, such as a gas turbine cycle. In other embodiments, the method can include the step of recovering heat from a source of renewable energy, such as a solar plant, by means of a solar concentrator, for instance.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the advantages thereof will be readily obtained as the same becomes better understood by reference to the following detailed description when considered in connection with the accompanying drawings, wherein.

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 2:
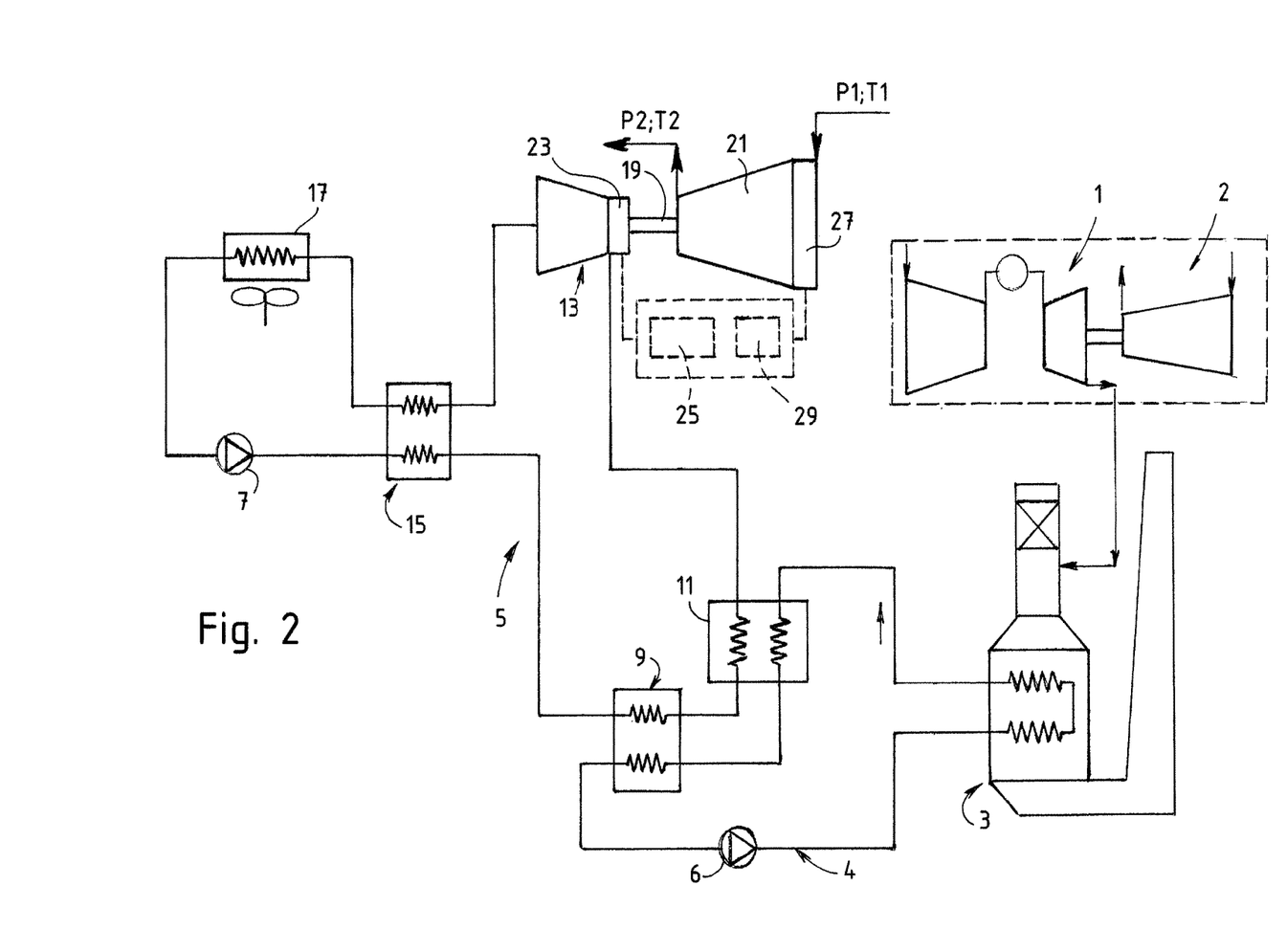
FIG. 2 illustrates a heat recovery system with a turboexpander driving a driven turbomachine according to one embodiment of the present disclosure.

In FIG. 2 a possible application of the turboexpander-driven turbomachine system is illustrated and will be described in greater detail here below. It should be understood that the application of the turboexpander and driven turbomachine system of FIG. 2 is only one exemplary embodiment of possible applications and uses of a system according to the subject matter disclosed herein. Specifically, in the embodiment illustrated in FIG. 2 the turboexpander recovers heat from a gas turbine driving a turbomachinery, such as a centrifugal compressor. However, it shall be understood that the source of heat to be recovered by means of the turboexpander could be any other heat source, e.g. a solar concentrator, a diesel engine for driving an electric generator, or the like.

Referring to FIG. 2, reference number 1 designates a gas turbine for driving a driven turbomachinery, such as a compressor or compressor train 2, e.g. a centrifugal compressor or a centrifugal-compressor train. The compressor 2 can belong to a compressor system for processing a refrigerant in a natural gas liquefaction system. In other embodiments, not shown, the gas turbine 1 can be used for electric generation purposes, rather than for mechanical drive. In such case the gas turbine 1 would be loaded with an electric generator. The gas turbine 1 generates combustion gases, which flow through a heat recovery exchanger 3 before being discharged in the atmosphere.

A first closed loop 4 is used to remove heat from the heat exchanger 3 and deliver it to a second closed loop 5. In the first closed loop 4 a heat transfer fluid, for example diathermic oil, is used to transfer heat removed from the combustion gases into the closed loop 5. Reference number 6 designates a circulating pump of closed loop 4.

The second closed loop 5 is a thermodynamic cycle. A working fluid circulating in the closed loop 5 is subject to thermodynamic transformations including condensing, pumping, heating, vaporizing, expanding, to transform heat energy into mechanical energy. In the embodiment disclosed herein the thermodynamic cycle performed in closed loop 5 is based on the Rankine cycle principle. A suitable working fluid, for example cyclopentane, or another suitable organic fluid usable in an organic Rankine cycle, is used in the second closed loop 5.

The second closed loop 5 comprises a circulating pump 7, a vaporizer 9, a superheater 11, a turboexpander 13, a recuperator 15 and a condenser 17. Additional components can be present in the circuit, as known to those skilled in the art.

The working fluid in the liquid state circulating in the second closed loop 5 is pumped at a first, higher pressure level by the circulating pump 7. The pressurized fluid is heated in the vaporizer 9 and in the superheater 11 by means of heat recovered by the fluid circulating in the first closed loop 4. At the outlet of the superheater 11 the working fluid circulating in the second closed loop 5 is in a superheated, gaseous, high-pressure state. The high-pressure, superheated working fluid is then expanded in the turboexpander 13. Exhausted fluid exiting the turboexpander 13 flows through the heat recuperator 15 and is finally condensed in condenser 17. The condenser 17 can include a liquid/air heat exchanger.

In the recuperator low-temperature heat contained in the expanded fluid exiting the turboexpander 13 is exchanged against the cold pressurized fluid in the liquid state delivered by the circulating pump 7.

In the exemplary embodiment illustrated in FIG. 2, the turboexpander 13 is mechanically connected by means of a mechanical transmission 19 to a driven turbomachine 21. For instance, the driven turbomachine 21 can be a compressor, for example a centrifugal compressor. In other embodiments, the driven turbomachine 21 can be a pump.

As will be discussed in more detail here below, the turboexpander 13 can be a multistage, integrally geared turboexpander. In the schematic representation of FIG. 2, however, the turboexpander 13 is illustrated in a simplified manner as a single stage turboexpander.

The turboexpander 13 is provided with a first set of moveable inlet guide vanes 23, which can be controlled by a first controller 25, based on parameters of the thermodynamic cycle performed in the second driven loop 5, in order to optimize the efficiency of the turboexpander 13, i.e. in order to maximize the mechanical power generated by the turboexpander 13.

The mechanical power generated by the turboexpander 13 can fluctuate, e.g. depending upon the operating conditions of the gas turbine 1. The temperature and the flow rate of the combustion gases can vary upon variation of the power generated by the gas turbine 1, which is in turn determined by the mechanical power required to drive the driven turbomachinery 2. This affects the operation of the turboexpander 13.

In other embodiments, the thermodynamic cycle 5 can be used to recover heat from a different heat source, for example from a solar concentrator. Also in this case, the heat source from which the thermodynamic cycle 5 receives heat to be transformed into mechanical power can undergo fluctuations, which require adjustment of the operating conditions of the turboexpander 13, in order to maximize the available mechanical power on the power output shaft of the turboexpander 13.

The driven turbomachine 21, e.g. a centrifugal compressor, processes a fluid which is different from the fluid circulating in the thermodynamic cycle 5. For example, the driven turbomachine 21 can be a compressor used to forward a gas in a pipeline. The compressor 21 is provided with a second set of moveable inlet guide vanes 27. A controller 29 can be used to adjust the position of the moveable inlet guide vanes 27 based on the operating parameters of the compressor 21 and on the rotary speed thereof.

The operating parameters of the compressor 21 are substantially represented by the inlet or suction pressure P1, the inlet or suction temperature T1, the outlet or delivery pressure P2, and the outlet or delivery temperature T2. The rotary speed of the compressor 21 is linked to the rotary speed of the turboexpander 13, since the mechanical transmission 19 provides for a fixed ratio between the rotary speed of the turboexpander 13 and of the driven turbomachine or compressor 21. If a direct drive is provided, such as schematically represented by shaft 19, the ratio can be 1. In general terms, if a different rotary speed is required, a gearbox can be arranged between the turboexpander 13 and the compressor 21.

In some embodiments, the movable inlet guide vanes 27 of the driven turbomachine or compressor 21 are controlled such that the rotary speed of the driven turbomachine 21, and therefore the rotary speed of the turboexpander 13 is maintained at a constant value or around a constant value within a range of tolerance.

With the arrangement described so far, the first set of moveable inlet guide vanes 23 is used by controller 25 to optimize the operation of the turboexpander 13 based on the conditions in the thermodynamic cycle 5, thus maximizing the mechanical power output of the turboexpander 13, while the controller 29 adjusts the second set of moveable inlet guide vanes 27 to control the rotary speed of the turbomachinery such that said speed is maintained at around a constant value, representing the design speed of the turboexpander 13, i.e. the speed at which the turboexpander 13 has the maximum efficiency.

With the arrangement described so far it is possible to match the different requirements of the turboexpander 13 and of the driven turbomachine 21 in an efficient manner. Bypassing the turboexpander 13 loosing part of the available power in the superheated working fluid of the thermodynamic cycle 5 is avoided. At the same time, a speed variator between the turboexpander output shaft and the driven turbomachine 21 is also avoided. Such speed variator would increase the overall costs and footprint of the turboexpander-driven turbomachine arrangement and would introduce power losses, reducing the overall efficiency of the system.

The second set of moveable inlet guide vanes 27 is controlled so that the rotary speed of the turbomachinery is maintained around the desired set value, taking into consideration the operating parameters of the driven turbomachine 21, in particular the inlet or suction pressure P1 and the outlet or delivery pressure P2, these two parameters being determined by the conditions, which must be maintained within the fluid which is processed by the driven turbomachine 21.

As mentioned above, in some embodiments the turboexpander 13 can be a single stage turboexpander with a single impeller mounted on a shaft, and provided with a single set of first moveable inlet guide vanes, as schematically shown in FIG. 2. On the opposite end of the shaft, the impeller of the driven turbomachine 21 can be mounted. The driven turbomachine 21 can be a multistage or a single stage turbomachine.

Figure 3:
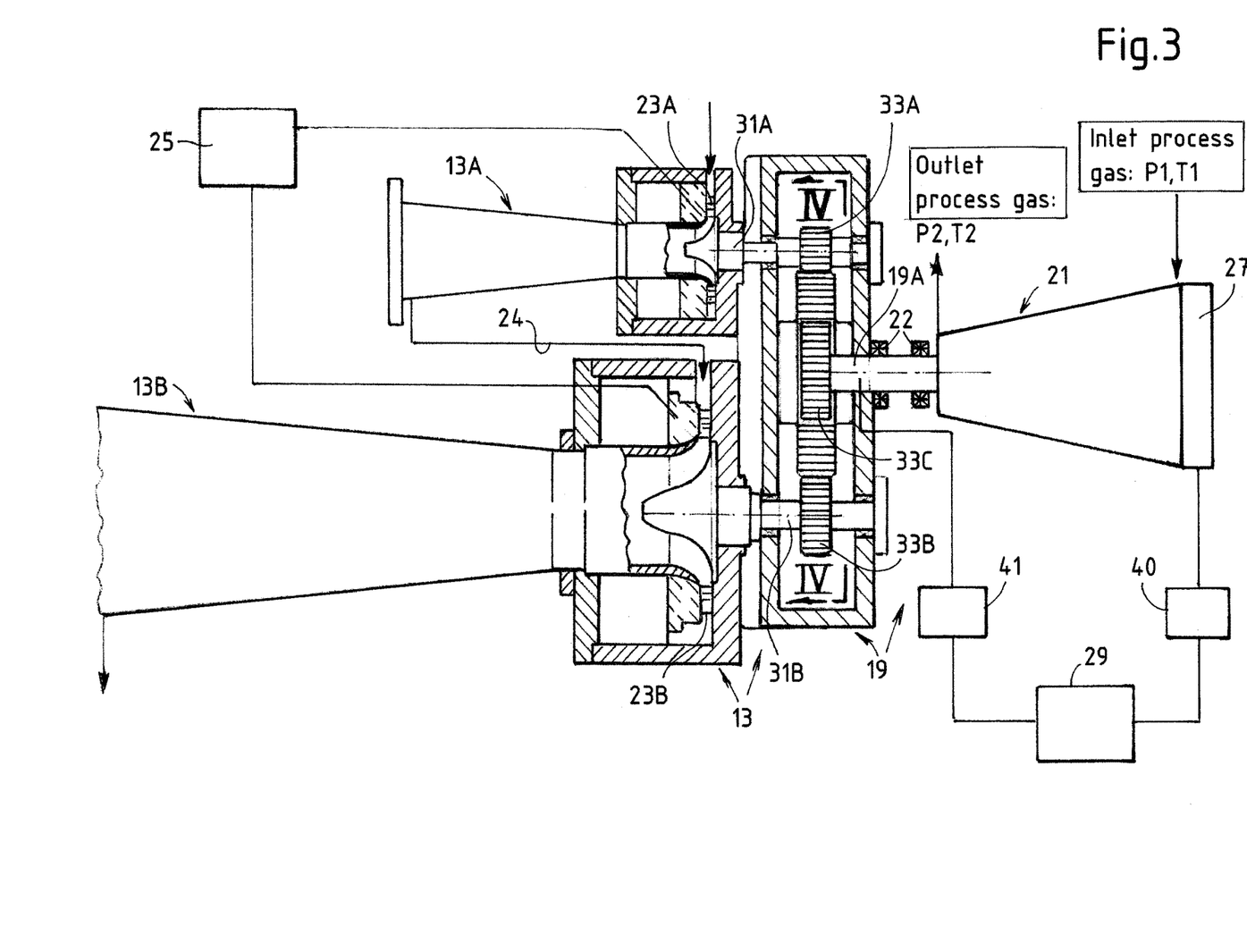
FIG. 3 illustrates a section of an integrally geared two-stage turboexpander driving a compressor according to one embodiment of the subject matter disclosed herein.
Figure 4:
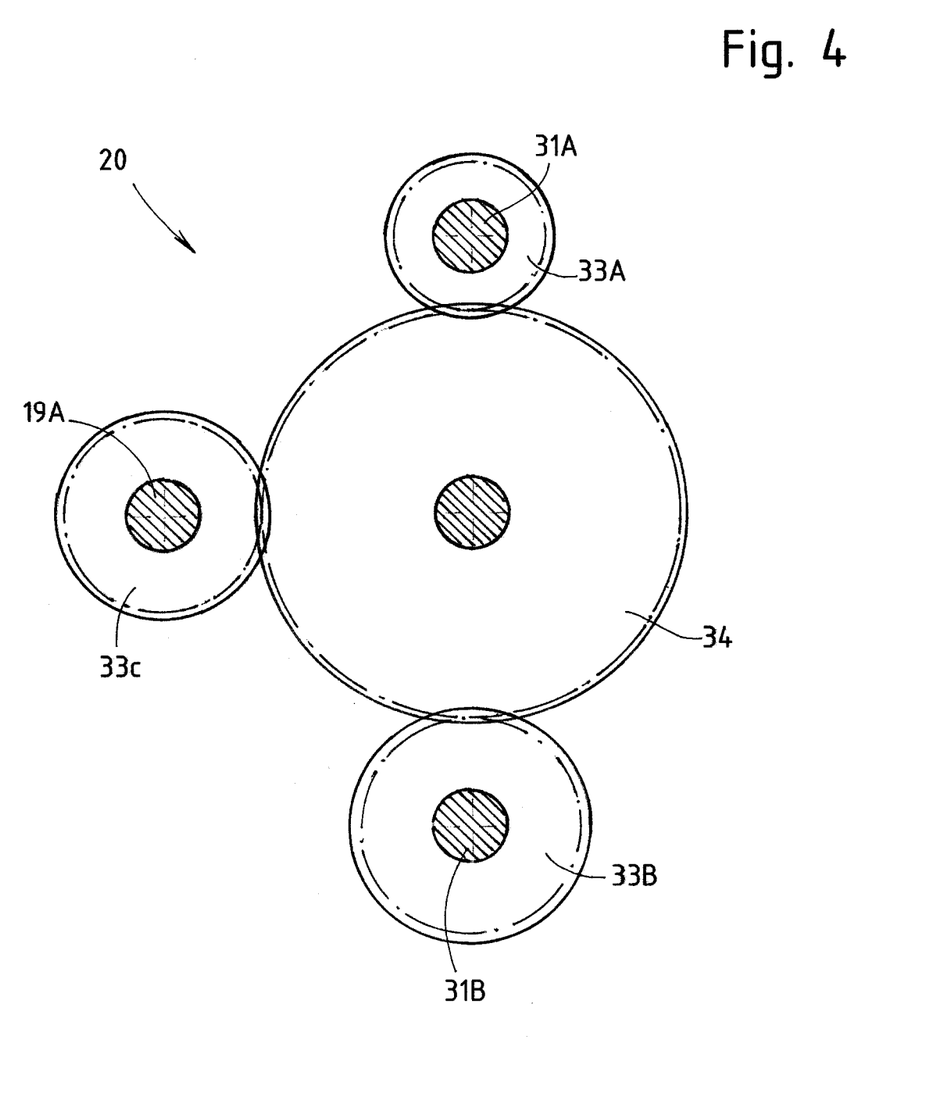
FIG. 4 illustrates a schematic of the gear arrangement of the turboexpander-compressor system of FIG. 3.

FIGS. 3 and 4 schematically illustrate the main features of a multistage turboexpander 13, and more specifically a two-stage turboexpander having a first, high pressure stage 13A and a second, low pressure stage 13B. The working fluid enters the first, high pressure stage 13A of the turboexpander 13 through a respective first set of moveable inlet guide vanes 23A, exits the first turboexpander stage 13A to be delivered through a pipe 24 to the inlet of the second, low pressure stage 13B of the turboexpander 13.

In the exemplary embodiment of FIG. 3 reference number 23B designates the respective first set of moveable inlet guide vanes of the low pressure stage 13B of turboexpander 13. The two sets of moveable inlet guide vanes 23A and 23B are controlled by a controller 25 in order to maximize the efficiency of the two-stage turboexpander 13. Maximization of a two-stage turboexpander in a heat recovery system, for example using an organic Rankine cycle, can be based for instance on an algorithm described in US 2011/0305556, the content of which is incorporated herein by reference.

In the schematic representation of FIG. 3 reference number 19 designates a mechanical transmission between the two-stage turboexpander 13 and the driven turbomachine 21, e.g. again a compressor, for instance a centrifugal compressor. Reference number 27 designates the second set of inlet guide vanes placed at the inlet of the driven turbomachine 21. P1 and T1 indicate the inlet pressure and the inlet temperature at the suction side of the turbomachine 21. P2 and T2 designate the outlet pressure and outlet temperature at the delivery side of the driven turbomachine 21.

In the exemplary embodiment of FIG. 3, the mechanical transmission 19 comprises a gearbox 20 with two driving inlet shafts and one driven outlet shaft. Reference number 31A designates the first inlet shaft on which a first impeller of the first, high pressure stage 13A of the turboexpander 13 is supported. The first inlet shaft 31A, therefore, rotates at the rotary speed of the impeller of the first, high pressure stage of the turboexpander 13. The impeller of the second, low pressure stage 13B of the turboexpander 13 is supported on a second inlet shaft 31B which rotates at the rotary speed of the impeller of the second, low pressure stage 13B of the turboexpander 13.

As best shown in FIG. 4, which illustrates a schematic representation in a front view according to line IV-IV of FIG. 3, the gear box 20 comprises a first gear 33A mounted on the first inlet shaft 31A and a second gear 33B mounted on the second shaft 31B. The two gears 33A and 33B mesh with a central crown wheel 34. A third gear 33C of the gearbox 20 is mounted on an output shaft 19A which is connected, for example through joints 22, to the shaft of the driven turbomachine 21.

The transmission ratios between the components 33A, 33B, 33C, 34 of the gearbox 20 are selected such that the two stages 13A, 13B of the two-stage turboexpanders 13 can rotate at the required design speed and drive the driven turbomachine 21 at the designed speed of the latter.

By means of controller 29 and a suitable servo-actuator 40, the rotary speed of the driven turbomachine 21 and consequently the rotary speed of the first turboexpander stage 13A and the second turboexpander stage 13B can be controlled and adjusted. A sensor 41 detects for example the rotary speed of the output shaft 19A of gearbox 20 and said parameter is used as a control parameter by the controller 29 to adjust the second set of moveable inlet guide vanes 27 of the compressor 21 in order, for example, to maintain the rotary speed at the required value or within a range of tolerance around said value.

Figure 5:
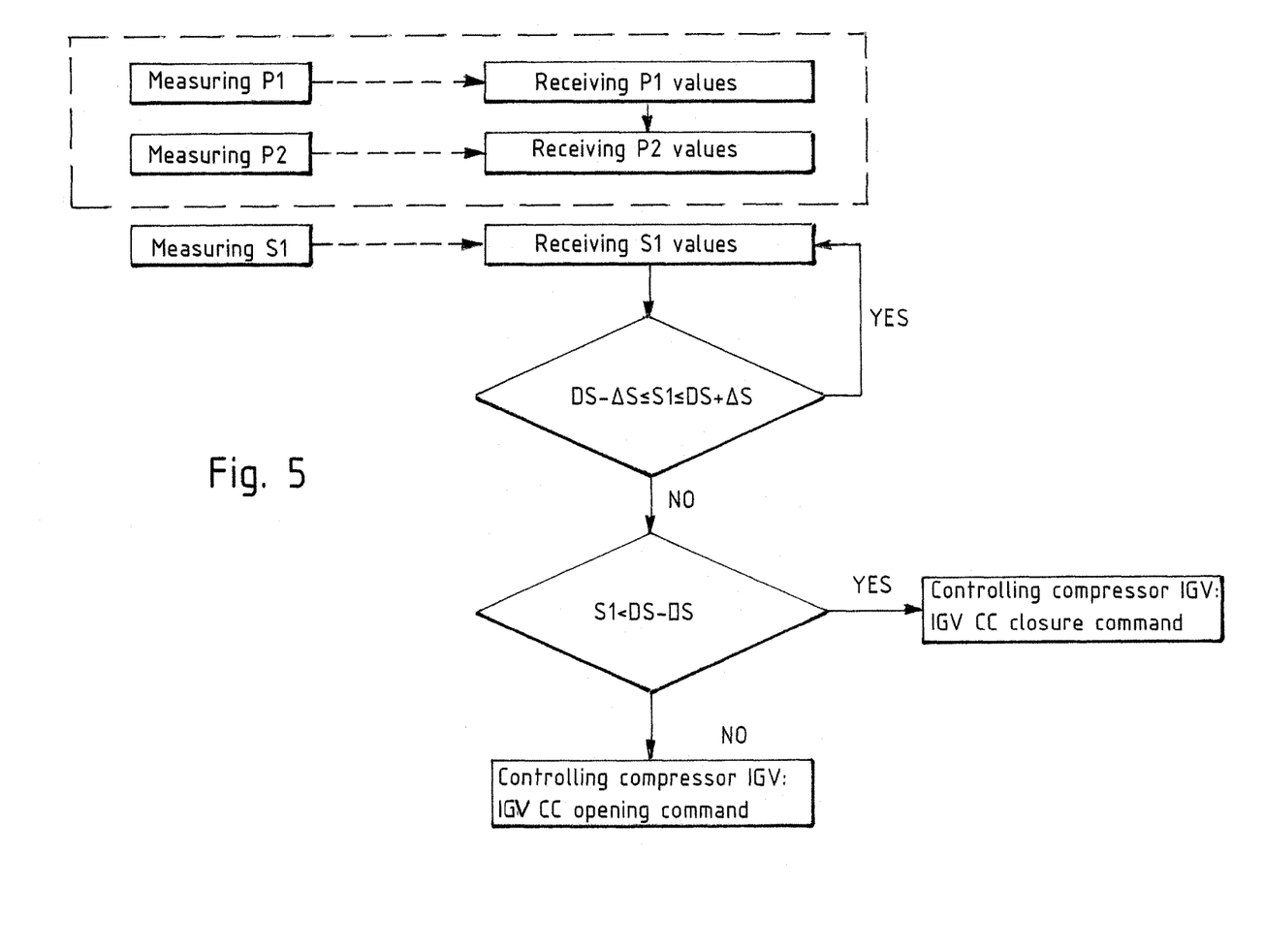
FIG. 5 illustrates a block diagram of the method for controlling the inlet guide vanes of the driven turbomachine.

The control algorithm performed by the controller 29 is summarized in FIG. 5. This algorithm applies irrespective of the number of stages of the turboexpander 13, which is controlled independently of the driven turbomachine 21 by the controller 25, for example using the algorithm disclosed in the above mentioned US 2011/0305556.

Turning now again to FIG. 5, the diagram illustrates the following. With suitable sensors the inlet pressure P1 and the outlet pressure P2 are measured and the measured values are delivered to the controller 29. The sensor 41 measures the actual rotary speed, indicated as S1 in FIG. 5, and said value is delivered to controller 29.

The controller 29 checks whether the measured speed S1 is within a range of tolerance around a set operating speed, which corresponds to design speed of the two turboexpander stages 13A, 13B, the speed ratio of the gearbox 20 being taken into consideration. In the diagram of FIG. 5 the required constant speed is designated DS. +/−ΔS designates a range of tolerance around the desired speed value DS.

If the measured value S1 is within the range of tolerance no action is taken and the controller 29 reiterates the algorithm step. If the measured speed value S1 is outside the range of tolerance, the controller checks whether such measured value is lower than the minimum acceptable speed value DS−ΔS. If this is the case, the controller 29 generates a signal which, by means of the servo-actuator 40, closes the second set of moveable inlet guide vanes. Otherwise, i.e. if the measured value S1 is above DS+ΔS, the controller causes the second set of moveable inlet guide vanes to open.

As a matter of fact, a rotary speed drop under the minimum admissible value DS−ΔS indicates that the power available from the turboexpander 13 is insufficient to process the flow rate of the fluid currently flowing through the driven turbomachine 21. Closing the set of moveable inlet guide vanes 27 of the driven turbomachine 21 reduces the flow rate of the fluid processed by the driven turbomachine 21, thus increasing the rotary speed back to a value within the admissible range of tolerance around value DS.

In the opposite case, if the speed S1 exceeds the maximum threshold DS+ΔS, the mechanical power available from the turboexpander 13 is higher than that required for processing the actual flow rate of the fluid flowing through the driven turbomachine 21. A higher flow rate can be processed in order to fully exploit the available mechanical power on the output shaft 19A, and therefore the moveable inlet guide vanes 27 of the driven turbomachine 21 are opened to allow a higher flow rate to be processed.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A turboexpander and driven turbomachine system comprising:
   a turboexpander configured to expand a first fluid, and comprising at least one expander stage with an expander impeller;
   at least one first set of moveable inlet guide vanes at an inlet of the at least one expander stage;
   a driven turbomachine configured to process a second fluid, different from the first fluid, the driven turbomachine comprising: at least one turbomachine impeller; and a second set of moveable inlet guide vanes at an inlet of the at least one turbomachine impeller;

a mechanical transmission between the turboexpander and the driven turbomachine; and a controller connected to the first set and second set of moveable inlet guide vanes, wherein the controller is configured to control the first set of moveable inlet guide vanes to maximize the available mechanical power output of the turboexpander, and wherein the controller is configured to receive information on a rotary speed of the turboexpander and the driven turbomachine, to control the second set of moveable inlet guide vanes to adjust the rotary speed to a desired speed value indicative of a design speed of the turboexpander, and to maintain the rotary speed at a constant speed within a range around the desired speed value, wherein the controller determines if a measured speed value is outside the range of the rotary speed around the desired speed value.

2. The system according to claim 1, wherein the at least one first set of moveable inlet guide vanes is configured to control at least one parameter of the first fluid and the at least one parameter of the first fluid comprises a fluid pressure.

3. The system according to claim 1, wherein the controller is further configured to adjust the rotary speed at the desired speed value by controlling exclusively the second set of moveable inlet guide vanes.

4. The system according to claim 1, wherein the first fluid is a working fluid of a heat recovery cycle comprising a heat source.

5. The system according to claim 4, wherein the at least one first set of moveable inlet guide vanes is controlled to adjust operating conditions of the turboexpander based on the heat available from the heat source.

6. The system according to claim 4, wherein the heat recovery cycle is an organic Rankine cycle.

7. The system according to claim 5, wherein the driven turbomachine comprises a compressor.

8. The system according to claim 7, wherein the controller is further configured to adjust a position of the second set of moveable inlet guide vanes based on operating parameters of the compressor.

9. The system according to claim 8, wherein the operating parameters of the compressor comprise a suction pressure, an inlet temperature, a delivery pressure, and a delivery temperature of the compressor.

10. A method of operating a system comprising a turboexpander, a driven turbomachine mechanically driven by the turboexpander, at least one first set of moveable inlet guide vanes at the turboexpander, a second set of moveable inlet guide vanes at the driven turbomachine, the method comprising:

expanding a first fluid through the turboexpander and generating mechanical power therewith;
rotating the driven turbomachine by the mechanical power generated by the turboexpander;
processing a second fluid, different from the first fluid, through the driven turbomachine;
controlling the at least one first set of moveable inlet guide vanes configured for maximizing the available mechanical power output of the turboexpander
controlling the second set of moveable inlet guide vanes configured for adjusting a rotary speed of the driven turbomachine and the turboexpander to a desired speed value, indicative of a design speed of the turboexpander;
maintaining the rotary speed constant, within a range around the desired speed value; and
determining if a measured speed value is outside the rotary speed range.

11. The method according to claim 10, further comprising controlling the at least one first set of moveable inlet guide vanes configured for maximizing the mechanical power generated by the turboexpander.

12. The method according to claim 10, further comprising:
recovering heat from a heat source by the first fluid; and
partly converting the heat to mechanical power in the turboexpander.

13. The method according to claim 10, wherein the driven turbomachine comprises a compressor and wherein the second set of moveable inlet guide vanes are adjusted based on operating parameters of the compressor.

14. The method according to claim 13, wherein the second set of moveable inlet guide vanes are adjusted based on an inlet pressure, an inlet temperature, a delivery pressure and a delivery temperature of the compressor.

15. The system according to claim 1, wherein the first fluid is a diathermic oil, and the second fluid is cyclopentane.

16. The method according to claim 10, further comprising:
responsive to the measured speed value being outside the range of the constant speed value, determining if the measured speed value is higher or lower than the range;
opening the second set of moveable inlet guide vanes responsive to the measured speed value being higher than the range; and
closing the second set of moveable inlet guide vanes responsive to the measured speed value being lower than the range.

17. The method according to claim 10, wherein the turboexpander has at least two stages and speed is determined by a speed ratio of a gearbox in the turboexpander.

18. A turboexpander and driven turbomachine system comprising:
a turboexpander configured to expand a first fluid, and comprising at least one expander stage with an expander impeller;
at least one first set of moveable inlet guide vanes at an inlet of the at least one expander stage;
a driven turbomachine including a compressor configured to process a second fluid, different from the first fluid, the driven turbomachine including: at least one turbomachine impeller; and a second set of moveable inlet guide vanes at an inlet of the at least one turbomachine impeller;
a mechanical transmission between the turboexpander and the driven turbomachine; and
a controller connected to the first set and second set of moveable inlet guide vanes, wherein the controller is configured to control the first set of moveable inlet guide vanes to maximize the available mechanical power output of the turboexpander, and wherein the controller is configured to control the second set of moveable inlet guide vanes to adjust a rotary speed of the turboexpander and the driven turbomachine based on a desired speed value indicative of the design speed of the turboexpander, in response to received information indicative of the rotary speed and operating parameters of the compressor.

19. The system according to claim 18, wherein the first fluid is a working fluid of a heat recovery cycle comprising a heat source; and wherein the at least one first set of moveable inlet guide vanes is controlled to adjust operating conditions of the turboexpander based on the operating parameters of the heat recovery cycle.

20. The system according to claim 18, wherein the first fluid is a working fluid of a heat recovery cycle comprising a heat source; and wherein the at least one first set of moveable inlet guide vanes is controlled to adjust operating conditions of the turboexpander based on the heat available from the heat source.

* * * * *